United States Patent

Wozar

[11] Patent Number: 5,603,590
[45] Date of Patent: Feb. 18, 1997

[54] MULTISPINDLE THREAD CUTTER APPARATUS

[76] Inventor: Joachim-Andreas Wozar, Weidenweg 2, 73733 Esslingen, Germany

[21] Appl. No.: 358,472

[22] Filed: Dec. 19, 1994

[30] Foreign Application Priority Data

Dec. 23, 1993 [DE] Germany .............. 43 44 037.1

[51] Int. Cl.$^6$ .................................. B23G 1/08
[52] U.S. Cl. ..................... 408/31; 408/139; 408/42
[58] Field of Search ............... 408/31, 53, 42, 408/139, 124; 470/181; 407/99

[56] References Cited

U.S. PATENT DOCUMENTS

| | | |
|---|---|---|
| 2,615,183 | 10/1952 | Johnson et al. . |
| 3,002,206 | 10/1961 | Johnson ................... 408/139 |
| 3,032,156 | 5/1962 | Anselm . |
| 3,037,393 | 6/1962 | Berhnhard . |
| 3,226,993 | 1/1966 | Varback . |
| 4,014,421 | 3/1977 | Johnson ................... 408/139 X |
| 4,029,429 | 6/1977 | Johnson ................... 408/139 X |
| 4,277,209 | 7/1981 | Benjamin et al. . |
| 4,524,654 | 6/1985 | Lucey ...................... 470/99 X |
| 4,705,437 | 11/1987 | Johnson .................. 470/181 X |
| 4,832,542 | 5/1989 | Johnson et al. ......... 470/181 X |

FOREIGN PATENT DOCUMENTS

| | | |
|---|---|---|
| 0547060 | 3/1932 | Germany . |
| 1295972 | 10/1962 | Germany . |
| 2659925 | 3/1976 | Germany . |
| 2612998 | 3/1976 | Germany . |
| 000447747 | 5/1936 | United Kingdom ............ 470/99 |

OTHER PUBLICATIONS

Waller, *Gewindebohrkopf fur kleinste Lochabstande*, Fachsimpeleien Aus Werkstatt Und Betrieb (Factory and Shop), vol. 101, No. 11, p. 705, 1968.

Ganss, *Mehrspindlige Bohr- und Gewindeschneidkopfe*, Tz. F. Prakt. Metallbearb. (Technical Journal for Practical Metal Machining), Vo. 16, No. 4, pp. 247–248, 1966.

*Primary Examiner*—M. Rachuba
*Assistant Examiner*—Henry W. H. Tsai
*Attorney, Agent, or Firm*—Browdy and Neimark

[57] ABSTRACT

A multispindle thread cutter apparatus is proposed, which has a drive shaft (3) to be driven by motor and which has a plurality of work spindles (4). Interposed between the drive shaft (4) and the work spindles (4) is a distributor and reversing gear (33), by way of which the work spindles (4) are driven to rotate by the drive shaft (3). Each work spindle (4) is assigned its own single reversing coupling (34), which has its own single switchover device (35), so that the directions of rotation of the work spindles (4) can be reversed while the drive shaft (3) continues to rotate uninterruptedly in the same direction.

17 Claims, 9 Drawing Sheets

MULTISPINDLE THREAD CUTTER APPARATUS

BACKGROUND OF THE INVENTION

1. Technical Field

The invention relates to a multispindle thread cutter apparatus, having a drive shaft to be driven by motor, having a plurality of work spindles disposed side by side, each of which can be equipped with a thread cutting tool, and having a distributor and reversing gear interposed between the drive shaft and the work spindles, by way of which gear the work spindles are driven to rotate by the drive shaft, and which has an indexable reversing coupling device, with which the directions of rotation of the work spindles can be reversed while the drive shaft continues to rotate in the same direction uninterruptedly, in that two gear wheels, driven to rotate in opposite directions by the drive shaft, are coupled in alternation to the work spindles.

2. Prior Art

One such multispindle thread cutter apparatus is disclosed by German Patent 547 060. It includes two centrally disposed gear wheels, which rotate in opposite directions continuously during operation, because one meshes directly, and the other indirectly via an intermediate wheel, with the drive shaft driven by a drive motor. A coupling disk provided with a toothed ring can be shifted between two indexing positions, in which it enters alternatingly into a rotary drive connection with one of the two gear wheels. Distributed along the circumference of the toothed ring are a plurality of driven gear wheels that engage it, and that are each connected to one work spindle to which a thread tap can be affixed. The instantaneous direction of rotation of the work spindles depends on the indexing position of the coupling disk, which in turn depends on the axial position of the work spindles, which shift axially during the thread cutting process relative to the housing that receives the distributor and reversing gear.

The distributor and reversing gear of the known apparatus is exposed to heavy loads, particularly in the region of the reversing coupling device that contains the coupling disk. This sets an upper limit on the number of work spindles present, and this limit is lower, the greater the forces that arise in the individual thread cutting processes. But even if the number of work spindles is kept reduced, nevertheless premature wear, which makes replacement of the affected parts unavoidable, must be expected in the region of the friction-locking connections between the coupling disk and a given gear wheel.

Admittedly problems in the region of the reversing coupling device can be circumvented by omitting such an reversing coupling device completely. Corresponding arrangements are disclosed in the journal "Werkstatt und Betrieb" [Factory and Shop], Vol. 101, 1968, No. 11, page 705, or from the journal "TZ f. prakt. Metallbearb." [Technical Journal for Practical Metal Machining], Vol. 16, 1966, No. 4, pp. 247/248. In such arrangements, however, the thread cutting process necessarily requires reversing of the drive shaft in order to switchover between counterclockwise and clockwise rotation. Thus the drive mechanism requires special provisions, which make its design and the thread cutting process relatively complicated and expensive.

In a multispindle thread cutter apparatus known from U.S. Pat. No. 2,615,183, a nonreversing operation of the drive shaft is possible, and the reversing coupling device that is present promises a greater capacity to withstand heavy loads, since in each case a form-locking coupling engagement can be made. However, because of the heavy load, not-insignificant wear might occur, especially in the switchover processes, which makes it appear wise to shut down the apparatus prematurely during the switchover process.

OBJECT AND SUMMARY OF THE INVENTION

The object of the present invention is to create a multispindle thread cutter apparatus of the type referred to at the outset that while maintaining a non-reversing drive shaft makes it possible to use a larger number of work spindles, without exposing the reversing coupling device to major wear or to an overload. This object is attained in that the reversing coupling device comprises a plurality of single reversing couplings), each of which has its own single switchover device, and each of the plurality of work spindles is assigned its own single reversing coupling.

In this way, instead of a single central reversing coupling device, a plurality of noncentrally disposed single reversing couplings are used, and each work spindle is driven by the drive shaft, independently of the other work spindles, via a single reversing coupling assigned to it. The single reversing couplings can easily be designed for the forces that arise, and so the individual load is relatively slight. Thus the danger of overloads in the coupling region is precluded, even if there are a large number of work spindles, and at the same time wear is reduced. Since each single reversing coupling has its own single switchover device, it would even be possible if needed to actuate the various single reversing couplings independently of one another and at different times, if a special application should require this.

Reversing gears for individual work spindles are indeed known per se, for instance from German Patent 12 95 972 or German Patent Disclosure DE 26 12 998 C2, or DE 26 59 925 C2. However, one skilled in the art finds no suggestion of how the central reversing coupling device should be removed entirely in the apparatus of the generic type in question, and a change instead be made to noncentral single couplings. It would at most be conceivable that one skilled in the art might think to replace the existing central reversing coupling device with one of the type taught by the three aforementioned references, in order thereby to increase the load capacity. The embodiment according to the invention, however, is not attained by those means.

A particularly compact structural form of the multispindle thread cutter apparatus is attained if each single reversing coupling has two driven gear wheels, driven to rotate in opposite direction continuously by the drive shaft, which can be coupled in alternation, via the associated single switchover device, to the respectively assigned work spindle and which are seated coaxially on the associated work spindle; the single switchover device is suitably located axially between the two driven gear wheels of a given work spindle.

Another practical embodiment provides for actuation of the single switchover devices of the single reversing couplings by relative axial shifting between a given work spindle and a housing that receives the contrarily rotating gear wheels. This makes it readily possible to trip the switchover between counterclockwise and clockwise rotation of the work spindles, while the rotational motion of the drive shaft remains uninterruptedly in the same direction, solely by changing the feed direction of the housing. The work spindles should suitably be supported in or on the housing so as to be axially movable, with a certain axial switchover play. This creates an autonomous apparatus that can be coupled in the form of a multispindle thread cutting head onto any arbitrary machining tool, especially in transfer systems, without having to perform complicated and expensive retrofitting work on the machine. Depending on the structural size, the apparatus according to the invention is also suitable for manual machine tools, or so-called power tools.

BRIEF DESCRIPTION OF THE DRAWINGS

The invention will be described in further detail below in terms of a first embodiment. Shown in detail are.

DETAILED DESCRIPTION OF THE PREFERRED EMBODIMENT(S)

Figure 1:
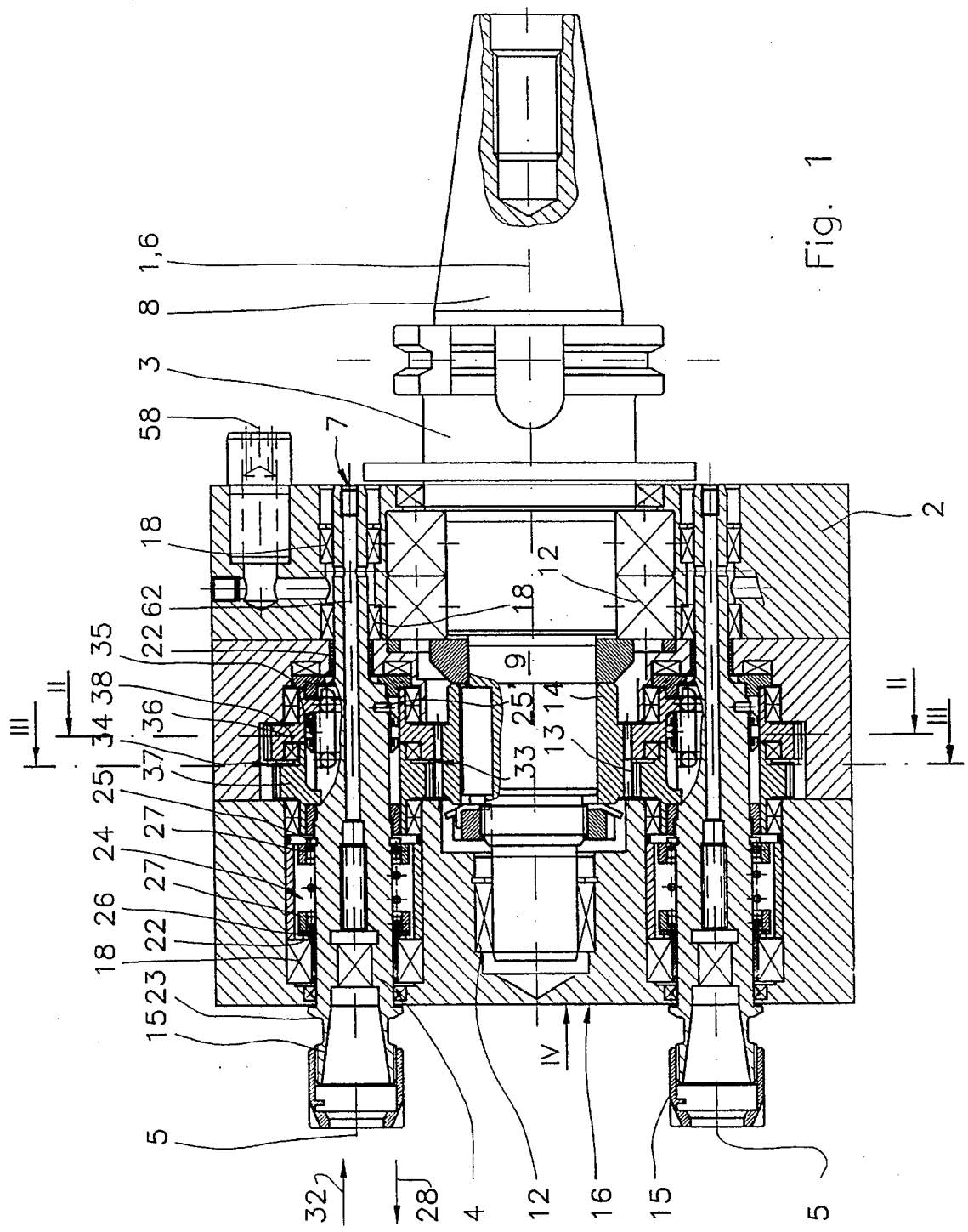
FIG. 1, a multispindle thread cutter apparatus, designed for outfitting a machining tool, for instance a machine tool, the multispindle thread cutter apparatus being in the form of a multispindle thread cutting head, in a longitudinal section taken along the line I—I of FIG. 2.

The multispindle thread cutter apparatus shown has a housing 2, built up in multiple layers in the axial direction 1, and in which a drive shaft 3 and a plurality of work spindles 4 are rotatably supported. The longitudinal axes 5 of the work spindles 4 extend parallel to one another and moreover are aligned parallel with the longitudinal axis 6 of the drive shaft 3.

Viewed in the axial direction indicated by the arrow IX, the work spindles 4 are grouped along the outer circumference of the central disposed drive shaft 3. In the exemplary embodiment, four work spindles 4 are provided, whose longitudinal axes 5 are located in the corner regions of square; the longitudinal axis 6 of the drive shaft 3 meets the diagonals of this square.

From the back 7, the drive shaft 3 protrudes with a clamping part 8, formed for example by a steep cone, which can be connected in a manner fixed against relative rotation to a spindle holder, not shown, of a machining tool, in order to drive the drive shaft 3 by machine in rotation about its longitudinal axis 6. Provision is made for the drive to be unidirectional, or in other words either counterclockwise or clockwise. A reversal of the direction of rotation during one machining operation is neither contemplated nor necessary. The lengthwise segment 9 of the drive shaft 3 disposed inside the housing 2 is stepped multiple times and is rotationally supported via bearing devices 12, particularly roller bearings. On the outer circumference of the aforementioned inner lengthwise segment 9, an encompassing driving toothed ring 13 is provided, which is connected to the drive shaft 3 in a manner fixed against relative rotation. As in the present case, it may be provided on a separate driving gear wheel 14 that is slipped onto the inner lengthwise segment in a manner fixed against relative rotation. Alternatively, the driving toothed ring 13 may be an integral component of the drive shaft 3.

Each work spindle 4 protrudes outward from the front 16 of the housing 2 by a clamping chuck segment 15. A thread cutting tool, particularly a thread tap, not shown in detail, can be interchangeably fixed in each clamping chuck segment 15. The inner lengthwise segment 17 of each work spindle 4 located inside the housing 2 is disposed so that relative to the housing 2 it is both rotatable and axially movable in the direction of the longitudinal axis 5. Radial shifting is accomplished by radial bearing arrangements 18, preferably embodied as roller bearings, that are accommodated in the front and rear regions of the housing. Slide bearing arrangements 22 disposed in the vicinity, an example being slide sheets, assure low-friction axial mobility. It will be understood that the radial bearings and slide bearings may be combined in any arbitrary way.

In FIG. 1, the work spindles 4 are shown in the outset position, in which they are maximally driven into the housing 2 in the region of the front 16. An axial pressure bearing 23 provided in the housing 2, which may cooperate with an axially spindle-mounted annular collar 19 of the drive shaft 4, defines the depth of insertion. The respective work spindle 4 is retained in the inserted outset position by a restoring spring assembly 24 that is accommodated in the housing 2. It is embodied for example by a helical compression spring, which coaxially surrounds the work spindle 4 in the region of the housing toward the front 7. The restoring spring assembly 24 is supported at one end on a radial protrusion 25 disposed in a manner fixed to the spindle and on the other end presses against a stop 26, located closer to the front 16 and firmly attached to the housing, which stop may be embodied by the front radial bearing arrangement 18. The support of the radial protrusion 25 and the support on the stop 26 firmly attached to the housing are suitably accomplished via displaceable cups 27 interposed at the ends.

If a work spindle 4 is pulled out of the housing (in the outward or extension direction 28) by relative motion with respect to the housing, then the restoring spring assembly 24 is compressed and exerts an oppositely oriented force in the insertion direction (arrow 32).

A combined distributor and reversing gear identified overall by reference numeral 33 is accommodated in the housing 2, interposed between the drive shaft 3 and the work spindles 4, and by way of this gear the work spindles 4 are driven to rotate, in a fashion derived from the rotary motion of the drive shaft 3. A component of the distributor and reversing gear 33 is a number of single reversing couplings 34, corresponding to the number of work spindles 4, each equipped with a single switchover device 35, and by way of which the direction of rotation at the time of a given work spindle 4 is defined.

The distributor and reversing gear 33 has two gear levels. The first gear level, shown in FIG. 2, includes a set of first driven gear wheels 36, and one such first driven gear wheel 36 is disposed axially on each work spindle 4. Supported in front of each first driven gear wheel 36 is a second driven gear wheel 37, coaxially in the direction toward the front 16; the set of second driven gear wheels 37 belongs to the aforementioned second gear level, which is shown in FIG. 3. The first and second driven gear wheels 36, 37 of a given work spindle 4 are freely rotatable relative to one another; via an interposed radial and/or axial bearing 38, they can be supported on one another. Via further bearing devices 42, the first and second driven gear wheels 36, 37 are rotationally supported in the housing 2. They are axially immovably fixed, so that if a relative displacement occurs between a work spindle 4 and the housing 2, an axial relative motion simultaneously takes place between the driven gear wheels 36, 37 and the associated work spindle 4.

The first and second driven gear wheels 36, 37, with the drive shaft 3 running, rotate constantly in opposite directions of rotation. For that purpose, the first driven gear wheels 36 mesh directly with the driving toothed ring 13 (FIG. 2), while the second driven gear wheels 37 are in constant gear engagement with the driving toothed ring 13 only indirectly via intermediate gear wheels 43 (FIG. 3). Preferably, two work spindles 4 each, immediately one after the other in the circumferential direction of the drive shaft 3, are coupled to one common intermediate gear wheel 43 disposed in the region between them, which then meshes with the driving toothed ring 13.

Figure 5:
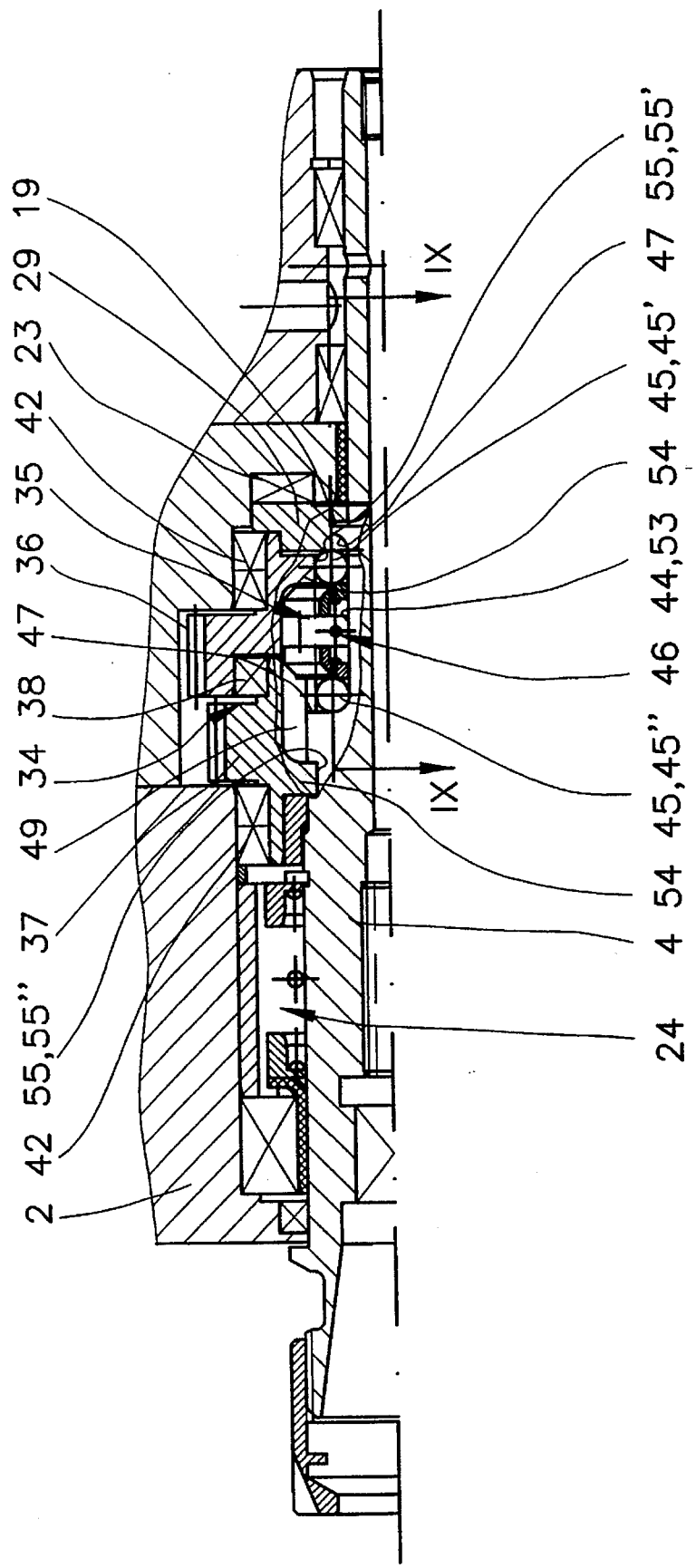
FIGS. 5–8, on a larger scale, in the region of the work spindle visible in FIG. 1; one spindle half, located above the center line is shown for each one, and in increasing order of the drawings, various indexing states for actuating the associated single reversing coupling or its single switchover device can be seen, namely a screw-in position (FIG. 5), a screw-in/unlatching position (FIG. 6), a neutral position (FIG. 7), and a maximum unscrewing position (FIG. 8)

Via the aforementioned single switchover devices 35, it can be determined which of the first and second driving gear wheels 36, 37 is at the moment connected for rotational drive with the associated work spindle 4. In an idling or neutral position shown in FIG. 7, both driven gear wheels 36, 37 are out of rotational engagement with the work spindle 4, so that this spindle is freely rotatable and hence can be stopped independently of the driven gear wheels 36, 37. In the first indexing position shown in FIG. 5, which by way of example represents the screw-in position for the thread-cutting operation, the rotating first driven gear wheels 36 are coupled to the work spindles 4, so that a clockwise spindle rotation takes place, in the exemplary embodiment. The second driven gear wheels 37 here are uncoupled. In the second indexing position shown in FIG. 8, which in the exemplary embodiment corresponds to the unscrewing position of the thread cutting operation, the second driven gear wheels 37 are coupled to the work spindles 4, while the first driven gear wheels are uncoupled, so that the result is a counterclockwise spindle rotation.

The various indexing positions are predetermined by the single switchover device 35 specific to the particular single reversing coupling 34. The design of the single switchover device 35 is shown best in FIGS. 5–9 in combination with FIGS. 2 and 3.

Each single switchover device 35 has an arbitrary number of axially extending guideways 44, four of them in the exemplary embodiment, for axially movable coupling members 45. The guideways 44 are attached firmly to the work spindle 4 in the region of the outer circumference thereof, at points that are preferably diametrically opposed in pairs. Here they are in the form of groovelike longitudinal indentations 53 made directly into the outer circumference of the work spindle 4. Each guideway 44 receives two coupling members 45, which in the exemplary embodiment are cylindrical or rollerlike, in such a way that they protrude radially beyond the outer circumference of the work spindle 4. The guideways 44 are located in a region radially between the driven gear wheels 36, 37 and the work spindle 4; an annular chamber 49 into which the coupling members 45 protrude is suitably provided between the inner circumference of the driven gear wheels 36, 37 and the outer circumference of the work spindle 4. A spring assembly 46 is disposed axially between the two coupling members 45 of each guideway 44 and is suitable for acting upon the coupling members 45, at least in certain axial positions, so as to spread them apart, or in other words acting upon them in the direction of axial motion stops 47, which are a terminal boundary of the guideways 44 and which in particular are embodied by face-end boundary faces of the longitudinal grooves that form the guideways 44.

Each of the guideways 44 in the exemplary embodiment is composed of two smooth path faces 48, 48' that are transverse to one another and in particular at right angles to one another. The result is longitudinal indentations 53 of triangular cross section (FIG. 3). The rollerlike coupling members 45 are supported by one end face on one path face 48, while they rest with their other cylindrical circumferential face on the other path face 48' and can roll along it.

The spring assembly 46 is preferably a helical compression spring that coaxially surrounds the work spindle 4 in the axial intermediate region between the first and second driven gear wheels 36, 37 and, via pressure transmitting cups 52, can act on the end face of the coupling members 45.

Of the two coupling members 45 seated in a given guideway 44, the first coupling member 45' is assigned to the first driven gear wheel 36, and the other or second coupling member 45" is assigned to the second driven gear wheel 37. Thus it is provided in the exemplary embodiment that the four first coupling members 45', received in the four longitudinal indentations 53 disposed at angular intervals of 90° from one another can cooperate with the first driven gear wheel 36, and the four second coupling members 45" can cooperate with the second driven gear wheel 37. One slaving cam 54 firmly connected to the associated first or second driven gear wheel 36, 37 as applicable is assigned to each first and second coupling member 45', 45", respectively. Preferably, as in the exemplary embodiment, two first and second coupling members 45', 45" adjacent to one another circumferentially can each be assigned a single slaving cam 54 in common. Slaving cams 54 are located in the region of the inside circumference of the driven gear wheels 36, 37 and protrude radially inward beyond them, into the annular chamber 49. As can be seen from FIGS. 2 and 3, the slaving cams 54 rest on a circle or part of a circle, with the portions of the coupling members 45 protruding radially outward into the annular chamber 49, relative to the longitudinal axis 5 as the center of the circle. If the single reversing coupling 34 has assumed the first or second indexing position, then the first coupling members 45' and the slaving cam 54 of the first driven gear wheel 36, are in a common radial plane, while the second coupling members 45" and the slaving cams 54 of the second driven gear wheel 37 are axially offset, or vice versa. As a result, the slaving cams 54 run over the first or second coupling members 45', 45" in the manner shown in FIGS. 2 and 3 and slave them, so that the work spindle 4 connected to the coupling members 45 in a manner fixed against relative rotation rotates in the same rotational direction as the respective driven gear wheel 36, 37 coupled to it.

In the exemplary embodiment, of the four each first and second coupling members 45', 45" provided, two at a time are intended for rotational slaving in clockwise rotation of the drive shaft 3, while the other two are intended for the rotational slaving in counterclockwise rotation of the drive shaft 3. As a result, with one and the same thread cutting apparatus, it is possible to cut both counterclockwise threads and clockwise threads without converting the equipment. Only the beginning direction of rotation of the drive shaft 3 has to be changed for this purpose. In the exemplary embodiment, the two coupling members 45 responsible each for a given direction of rotation diametrically oppose one another in pairs. Each driven gear wheel 36, 37 has two diametrically opposed slaving cams 54, which with play of motion in the circumferential direction engage between two coupling members 45 that are responsible for different directions of rotation. Two slaving faces 55 pointing in opposite circumferential directions are provided on each slaving cam 54; for the sake of better distinction, these have been marked as first slaving faces 55' for the first driven gear wheel 36 and second slaving faces 55" for the second driven gear wheel 37. It becomes clear from FIG. 2 that upon clockwise rotation of the first driven gear wheels 36, the first slaving faces 55 pointing in the corresponding direction run over the cylindrical jacket faces of the associated first coupling members 45'. For an opposed direction of rotation, the oppositely pointing slaving faces run correspondingly over the adjacent coupling members 45, as can be seen from FIG. 3.

It will be understood that particularly in cases in which only clockwise or only counterclockwise threads need to be cut, the number of coupling members 45 per driving gear wheel 36, 37 can be reduced. With respect to the exemplary embodiment, if exclusively clockwise threads are to be cut the coupling members 45 not shown in engagement in FIGS. 2 and 3 could therefore be removed, in which case the guideways 44 would remain empty at the applicable point.

It may also be advantageous to provide only a single coupling member 45 per guideway 44; for example, only two first (45') and two second (45") coupling members would be present, each located in diametrically opposed guideways 44. The result seen in an axial direction is then a practical arrangement in which the first and second coupling members 45', 45", in the circumferential direction of the work spindles 4, are disposed alternatingly in succession, particularly offset at angles of 90°, in separate guideways 44.

Since in the engaged state force transmission takes place between the slaving cams 54 secured to the gear wheels and the work spindle 4, via the cylindrical jacket faces of the rollerlike coupling members 45, optimal force transmission from linear contact takes place, which allows heavier loads compared with coupling members embodied as balls.

The slaving cams 54 of the first driven gear wheel 36 and those of the second driven gear wheel 37 are spaced apart in the axial direction. Preferably the axial spacing is greater than that of the axial motion stops 47 of the guideways 54, or of coupling members 45 that assume the maximal axial spacing from one another.

It will be understood that the guideways may also be provided on the driven gear wheels and the slaving cams may also be provided on the work spindles.

Figure 2:
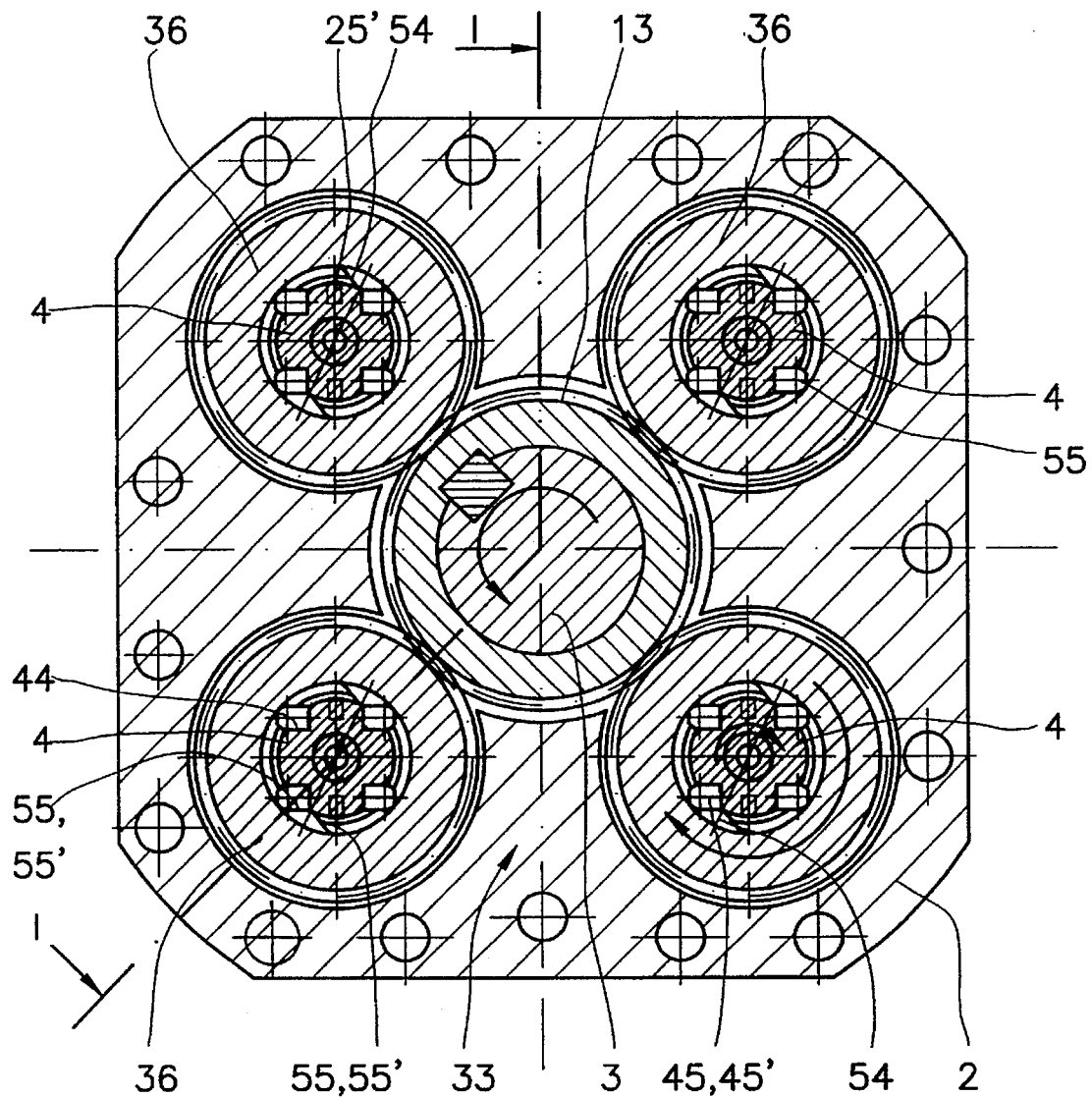
FIG. 2, a cross section through the apparatus of FIG. 1 taken along the line II—II.
Figure 3:
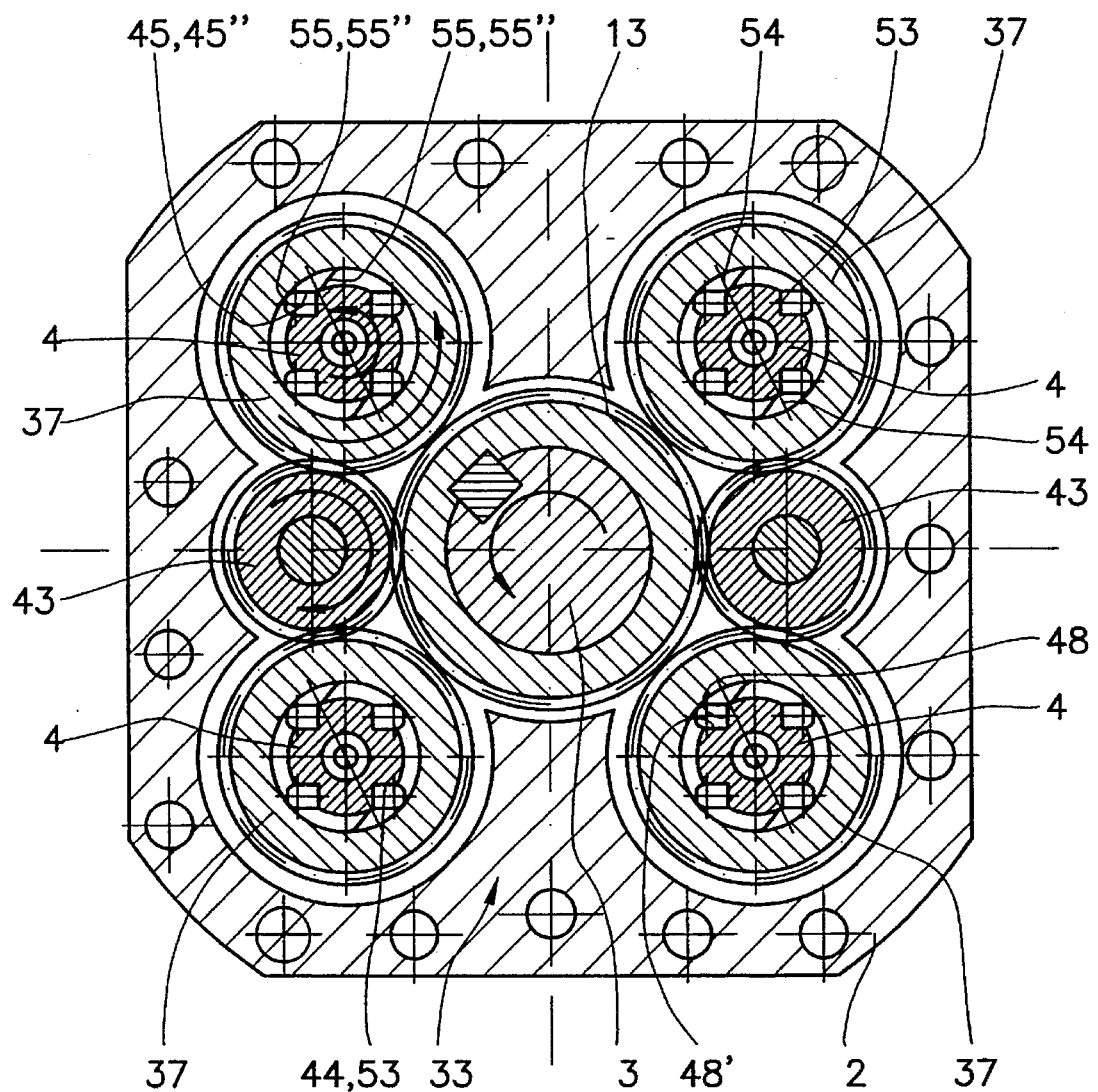
FIG. 3, a cross section through the apparatus of FIG. 1 taken along the line III—III.
Figure 4:
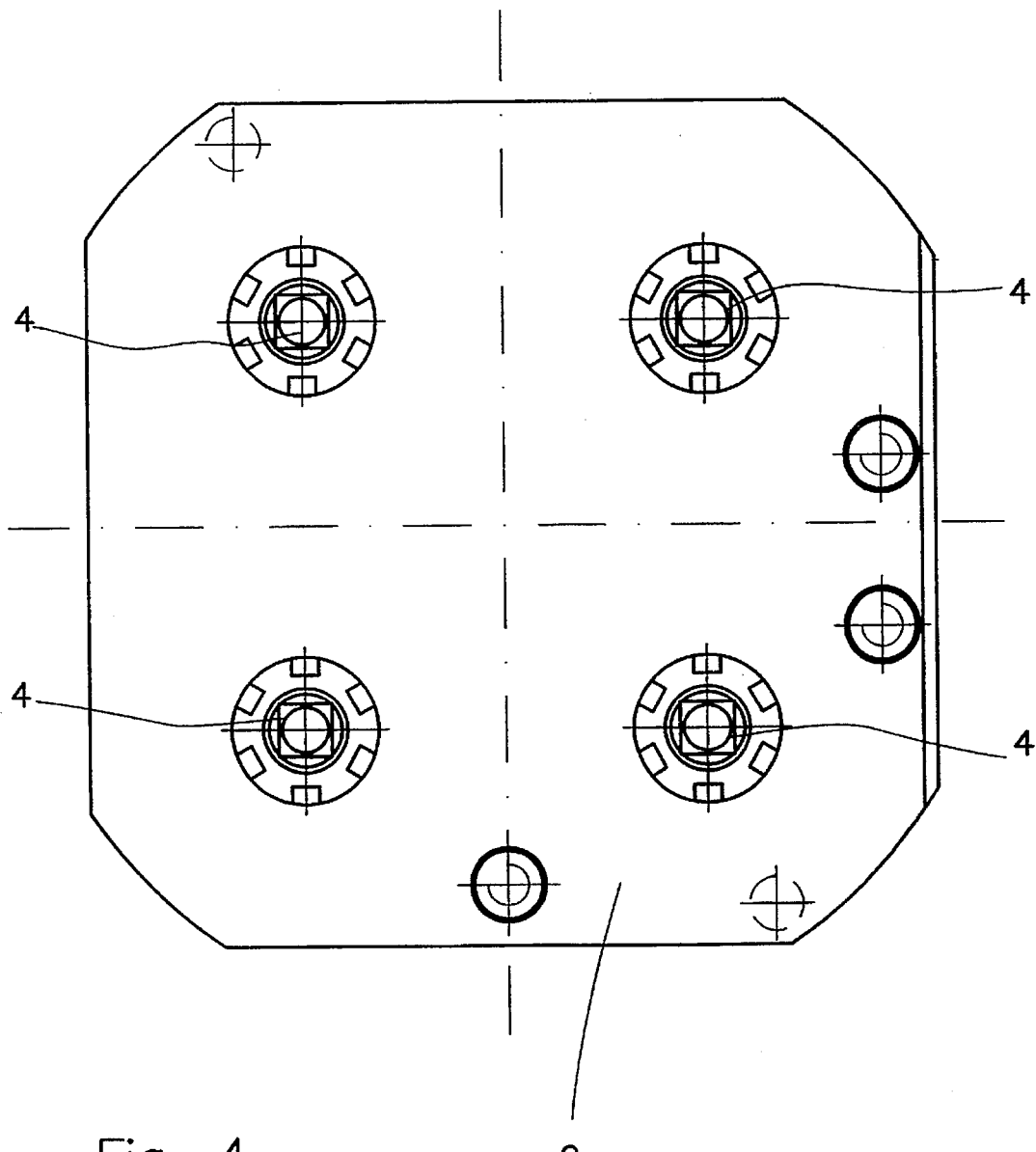
FIG. 4, a front elevation view of the apparatus of FIG. 1 looking in the direction of the arrow IV.

In the exemplary embodiment, the spring assembly 46 presses continuously axially against the second coupling members 45", which thus, at least as long as they are out of engagement with a slaving cam 54, come to rest on the axial motion stops 47 that axially limit the guideways 44, the prestressing of the spring assembly 46 is attained by a radial protrusion 25', visible in FIGS. 1 and 2, which is permanently disposed on the work spindle 4 and on which the spring assembly 46 is supported with its end region toward the first coupling members 45'. The first coupling members 45' are received, suitably with axial play of motion, between the associated end region of the spring assembly 46 and the associated axial motion stop 47 limiting the guideway 44 and are not acted upon continuously. In a departure from this, however, the first coupling members 45' may also be under constant action from the spring assembly 46.

A preferred thread cutting cycle will now be explained, in terms of FIGS. 5–8.

The drive shaft 3 is coupled to the main spindle of a machining tool; the housing 2 is fixed to the machine unrotatably. The drive shaft 3 is driven to continuous, uninterrupted counterclockwise rotation. The thread taps provided on the work spindles 4 are still out of engagement with the workpiece, which is not shown. At that moment, the single switchover devices 35 are in the first indexing position (screw-in position) shown in FIG. 5, in which the first gear level (FIG. 2) is in rotational slaving connection with the work spindles 4. The applicable slaving cams 54 of the first driven gear wheel 36 are in a radial plane with the first coupling members 45'. The axial position of the first coupling members 45' is predetermined by the spring assembly 46, resting on it on one axial end, and an axial motion stop 29 provided on the other axial end, which is supported toward the housing and in the exemplary embodiment is embodied by an intermediate ring. At the same time, the second coupling members 45" are disposed axially next to the slaving cams 54 of the first driven gear wheels 36, so that no rotational slaving engagement exists. The position of the second coupling members 45" is determined by the position of the associated axial motion stops 47 of the work spindles 4, the work spindles 4 now all rotate clockwise.

The entire thread cutting apparatus, here embodied as a multispindle thread cutting head, is now moved, via the forward feed of the machining tool, to the work piece that is to be provided with threads. In the course of further forward feeding, the thread taps cut the thread, and the feed of the housing 23 suitably matches the feed of the thread cutting tools, and as a result is equivalent to the product of the rotational speed and the thread pitch. The design within the various work spindles 4 is chosen such that the product of the thread pitch and the rotary speed in each case is identical. That is, if threads of different pitch are cut at the same time, then the matching feed is assured by means of suitable adaptation of the gear ratio in the trains of the distributor and reversing gear 33 leading to the individual work spindles 4. Differently dimensioned first and second driven gear wheels 36, 37 will then be used, for example.

Figure 6:
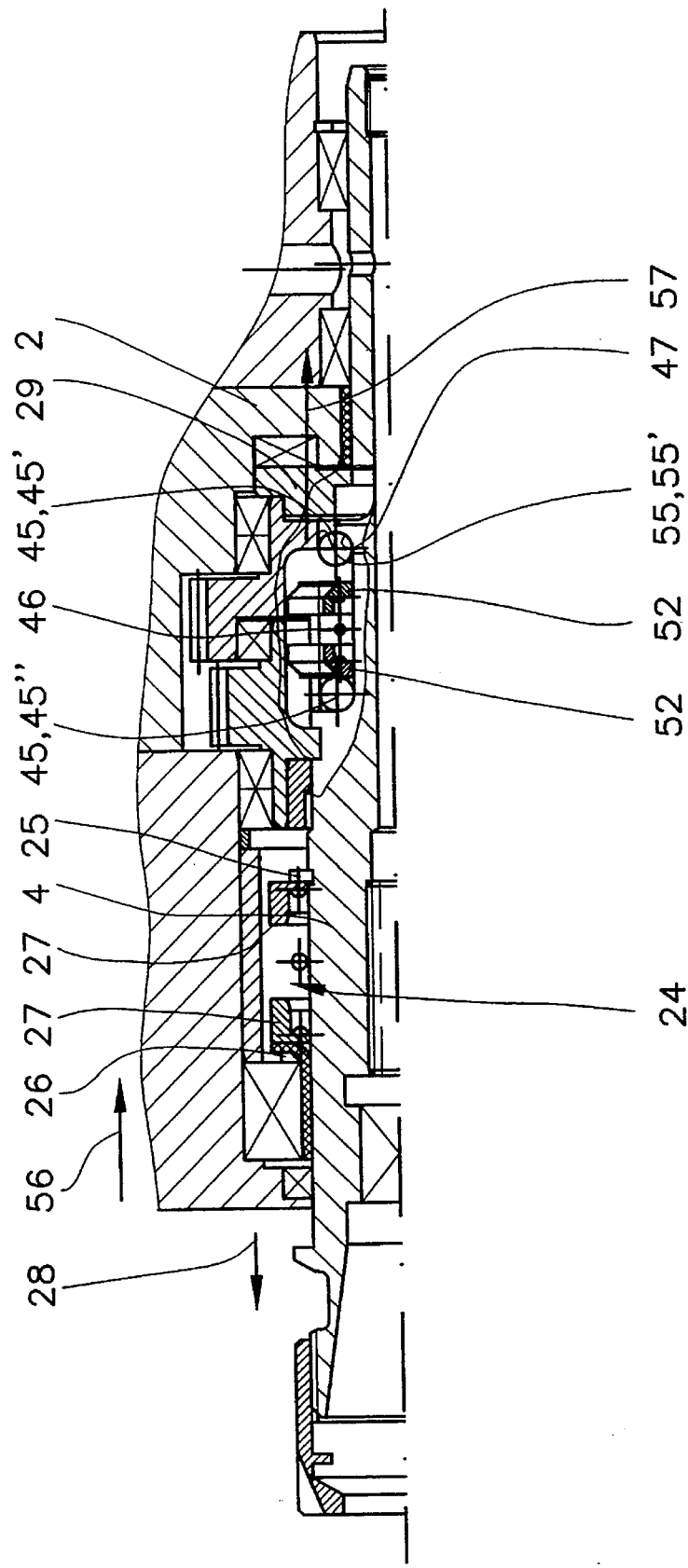
Figure 7:
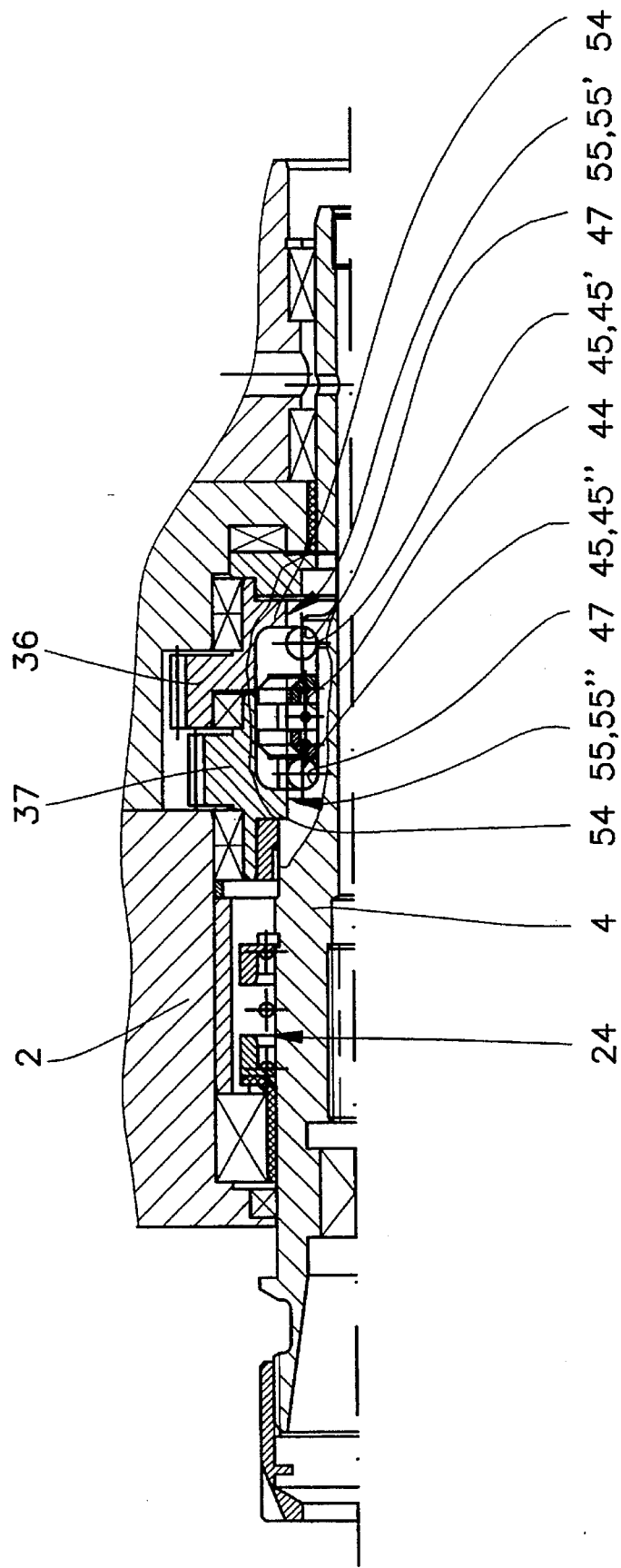

Even before the thread depth to be cut is reached, the feed direction of the multispindle thread cutting head is reversed. The drive shaft 3, the housing 2, and the first and second driven gear wheels 36, 37 axially movably supported in it therefore move backward in the direction of the arrow 56 (FIG. 6). Because of the thread engagement of their thread cutting tools, the work spindles 4 cannot follow. The result is an axial relative motion between the driven gear wheels 36, 37 and a given work spindle 4, in which the latter is extended, i.e., moves outward relative to the housing 2, as indicated by the arrow 28. In the context of this motion, the first coupling members 45' are unlatched from the slaving connection with the associated slaving cams 54, since the latter move axially away in accordance with the arrow 57, and the first coupling members 45' are hindered from a further axially inward motion by the associated axial motion stops 47. The situation shown in FIG. 6 can therefore be called the screw-in/unlatching position; the first coupling members 45' are just about to leave the first indexing position, but the second coupling members 45' have not yet reached the second indexing position. The first coupling members 45' are suitably no longer acted upon by the spring assembly 46 here, whose associated end region is shifted together with the work spindle 4 as a result of the cooperation with the radial protrusion 25'. After a certain reverse motion of the housing 2, the neutral position shown in FIG. 7 is reached, in which all the coupling members 45 are out of engagement with the slaving cams 54, so that the work spindles 4 briefly stop. The indexing travel of the first coupling members 45' between the first indexing position and the neutral position must be taken into account in reversing the feed direction, so that the correct thread depth will be assured.

During the outward motion 28, the restoring spring assembly 24 is compressed.

Figure 8:
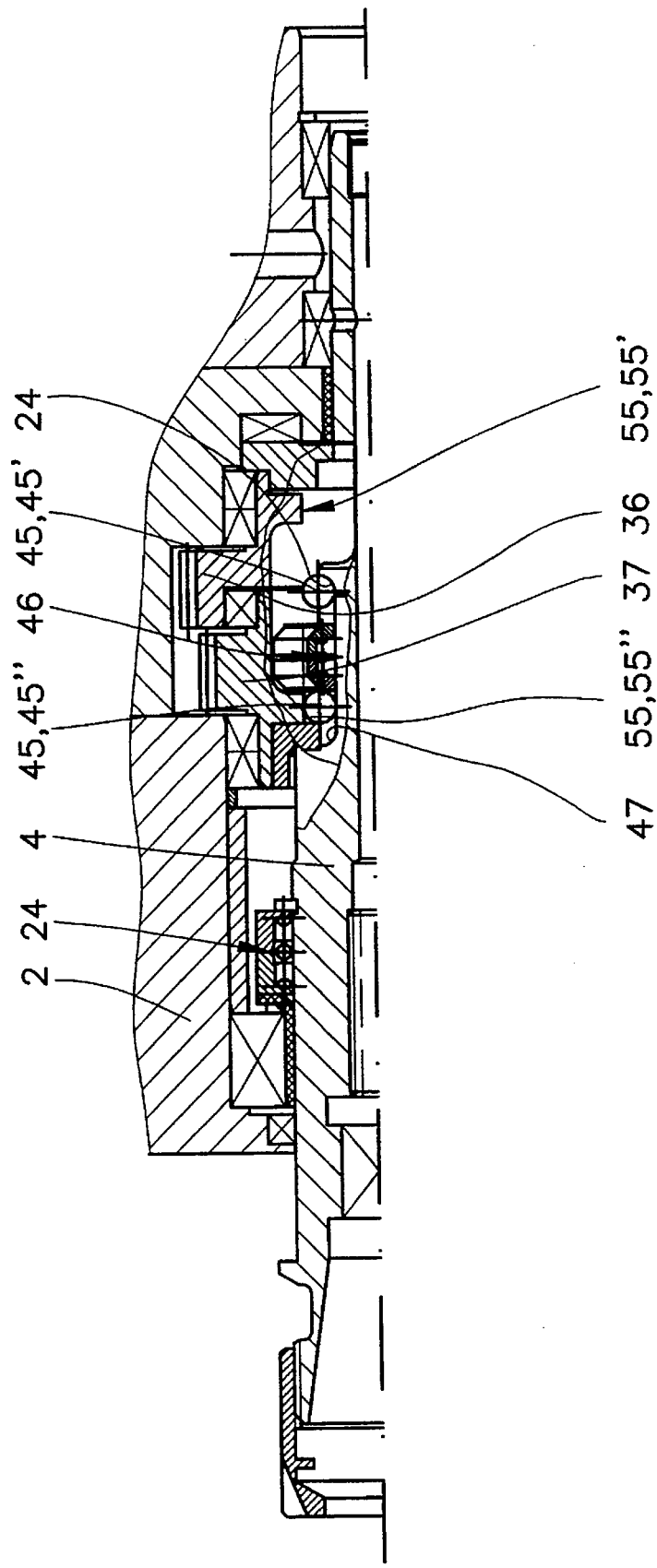
Figure 9:
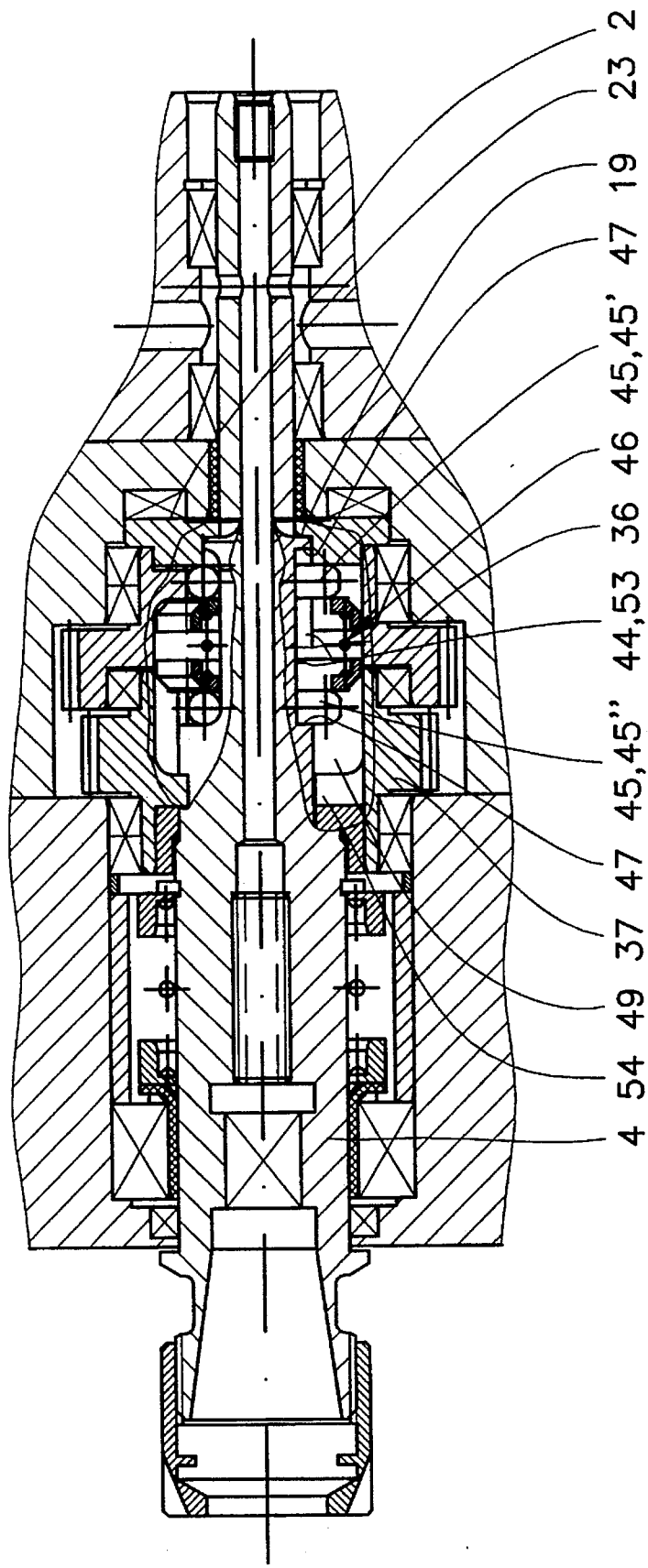
FIG. 9, an enlarged detail of FIG. 5, taken along the line IX—IX.

As a result of the continuing reverse feed motion 56, the single switchover device 35 finally reaches the second indexing position (unscrewing position) shown in FIG. 8, in which the second coupling members 45" are in engagement with the associated slaving faces 55". The axially compressible spring assembly 46 disposed between the coupling members 45 here assures a certain axial compensating motion of the second coupling members 45", thus reducing indexing impacts upon latching into the second indexing position. The first coupling members 45', which exert no function in the second indexing position, are freely movable between the end region of the spring assembly 46 defined by the radial protrusion 25' and the axial motion stop 47 of the associated guideway. If one wished not to undertake such compensation, then under some circumstances one might even dispense with the axially movable support of the coupling members 45 in guideways 44 and instead provide coupling members disposed so as to be axially fixed to the spindles.

Since the axial spacing of the first and second coupling members 45', 45" is less than that of the slaving cams 54 of the two driven gear wheels 36, 37, the second coupling members 45', in the second indexing position, are always kept out of engagement with the slaving cams 54 of the first driven gear wheel 36 by the associated axial motion stops 47.

In the second indexing position, the work spindles 4 assume their maximally extended position, in which the restoring spring 24 is also maximally compressed. As soon as the thread cutting tools are out of engagement with the workpiece, the restoring spring assembly 24 assures an automatic indexing back into the first indexing position, by causing an inward or insertion motion 32 of the work spindles 4 relative to the housing 2.

If threads with different axial thread depths are to be cut in each operation, then this is compensated for by having the applicable thread cutting tools protrude variously far, so that the thread cutting engagement begins after the housing 2 has been fed forward by different lengths.

In the entire arrangement, it is advantageously possible to dispense with external switchover signals for the single switchover devices 35. The switchover takes place automatically by reversal of the feed of the drive shaft 3, or of the driven gear wheels 36, 37 that are in continuous rotational connection with it. Since the single reversing couplings 34 and the single switchover devices 35 are independent of one another, the switchover times can even vary slightly from one another, without damage to the apparatus. This also allows a certain compensation of production tolerances.

In FIG. 1, reference numeral 58 also indicates a cooling and/or cutting fluid supply, from which the applicable medium can reach the working region on the front 16 through axial conduits 16 in the individual work spindles 4.

We claim:

1. A multispindle thread cutter apparatus, comprising:
   a drive shaft including means to be driven by motor;
   a plurality of work spindles disposed side by side, each one of the work spindles including means for the one of the work spindles to be equipped with a thread cutting tool; and
   a distributor and reversing gear interposed between the drive shaft and the work spindles, including
   two gear wheels, driven to rotate in opposite directions by the drive shaft,
   means for the work spindles to be driven to rotate by the drive shaft, and
   an indexable reversing coupling device, the reversing coupling device including means for the directions of rotation of the work spindles to be reversed while the drive shaft continues to rotate uninterruptedly in a same direction,
   the two gear wheels, driven to rotate in opposite directions by the drive shaft, being coupled in alternation to the work spindles; wherein
   the reversing coupling device comprises a plurality of single reversing couplings (34), each of which includes a respective single switchover device (35), and
   each of the plurality of work spindles (4) includes a respective single reversing coupling (34) of the plurality of single reversing couplings (34).

2. The apparatus of claim 1, wherein each single reversing coupling (34) includes the two driven gear wheels (36, 37), driven to rotate in opposite direction continuously by the drive shaft, and includes means for the driven gear wheels to be coupled in alternation, by the associated single switchover device (35), to a respectively assigned work spindle (4), the work spindles each including means for being disposed so as to be axially movable in particular with respect to the driven gear wheels (36, 37).

3. The apparatus of claim 2, wherein the respective two driven gear wheels (36, 37) are disposed coaxially side by side.

4. The apparatus of claim 2, wherein the respective two driven gear wheels (36, 37) are disposed coaxially on the associated work spindle (4).

5. The apparatus of claim 3, wherein the respective single switchover device (35) is disposed axially between the two driven gear wheels (36, 37) of a given work spindle (4).

6. The apparatus of claim 2, wherein
   each single switchover device (35) includes at least one first coupling member (45, 45'), associated with a first driven gear wheel (36), and at least one second coupling member (45, 45"), associated with a second driven gear wheel (37), and
   the first and second coupling members (45, 45', 45"), are axially spaced apart from one another, and include means for being connected in a manner fixed against relative rotation to the work spindle (4);
   at least one first slaving face (55, 55') is disposed on the first driven gear wheel (36) and at least one second slaving face (55, 55") is disposed on the second driven gear wheel (37), both including means for being fixed against relative rotation; and
   the work spindle (4) and the two driven gear wheels (36, 37) include means for being movable relative to one another in the longitudinal direction (5), and for in alternation, in a first indexing position (FIG. 5), putting the first coupling members (45, 45') into a first rotationally slaving engagement with the first slaving faces (55, 55'), and in a second indexing position (FIG. 8) putting the second coupling members (45, 45") into a second rotationally slaving engagement with the second slaving faces (55, 55"), wherein the driven gear wheel that is out of engagement at the moment is freely rotatable relative to the work spindle (4).

7. The apparatus of claim 6, wherein in a neutral position of the respective single switchover device (35), said neutral position being between the two indexing positions, all the coupling members (45) and slaving faces (55) are out of engagement, such that both driven gear wheels (36, 37) are freely rotatable relative to the work spindle (4).

8. The apparatus of claim 6, wherein the coupling members (45) comprise rolling elements having a roller or cylinder form.

9. The apparatus of claim 6, comprising slaving cams (54) which include the slaving faces (55), said slaving cams being firmly secured to the gear wheels, of the driven gear wheels (36, 37).

10. The apparatus of claim 6, wherein the first and second coupling members (45, 45', 45") are received longitudinally movably, pairwise, in axially oriented guideways (44) of the associated work spindle (4) and are pressed away from one another in the direction of outset positions by a spring assembly (46), the apparatus including means for the first and second coupling members to contact axial motion stops (47) firmly attached to the spindles, which stops define the guideways (44).

11. The apparatus of claim 6, comprising a housing (2), and wherein
   the single switchover devices 35 of the single reversing couplings (34) are actuatable by relative axial shifting between a respective work spindle (4) and the housing (2), the housing (2) including means to axially immovably receive the contrarily rotating gear wheels, whereby the drive shaft (34) can rotate uninterruptedly in the same direction.

12. The apparatus of claim 6, comprising
   a restoring spring assembly (24) including means for prestressing the single switchover device (35) into an indexing position,
   the spring assembly including means to function between the driven gear wheels (36, 37) and the respectively associated work spindle (4), and wherein
   in the indexing position the slaving faces (55) provided on one of the two driven gear wheels (36, 37) are in engagement with the associated coupling members (45).

13. The apparatus of claim 1, including a housing (2) in which the distributor and reversing gear (33) is received and in which both the drive shaft (3) and the work spindles (4) are rotatably supported.

14. The apparatus of claim 13, comprising a multispindle thread cutting head, and wherein the drive shaft (3) includes means to be coupled to the main spindle of a machining tool, and including means for controlling an axial depth of a thread to be cut and a switchover procedure of the single switchover devices (35) by a forward feed or a reversal of feed of the main spindle of the multispindle thread cutting head connected thereto.

15. The apparatus of claim 1, wherein the drive shaft (3) includes a central shaft, around which the work spindles (4) are grouped, and the driven gear wheels (36, 37), corresponding to a given work spindle (4), of each of the single reversing couplings (34) mesh directly or indirectly, via reversing gear wheels (43), with a central single- or multiple-part driving toothed ring 13) of the drive shaft (3).

16. The apparatus of claim 1, including means for the single reversing couplings (34) to be actuatable independently of one another.

17. The apparatus of claim 1, wherein a forward feed speed of all the work spindles (4) is constant in the thread cutting process, and different thread pitches are compensated for means for causing differing rotary speeds of the work spindles (4), brought about by suitable gear ratios of the trains of the distributor and reversing gear (33) leading to the individual work spindles (4).

\* \* \* \* \*